United States Patent
Kordari et al.

(10) Patent No.: US 10,215,587 B2
(45) Date of Patent: Feb. 26, 2019

(54) METHOD FOR STEP DETECTION AND GAIT DIRECTION ESTIMATION

(71) Applicant: TRX Systems, Inc., Greenbelt, MD (US)

(72) Inventors: Kamiar Kordari, McLean, VA (US);
Benjamin Funk, Hanover, MD (US);
Jared Napora, Severn, MD (US);
Ruchika Verma, Bethesda, MD (US);
Carole Teolis, Glenn Dale, MD (US);
Travis Young, Rockville, MD (US)

(73) Assignee: TRX SYSTEMS, INC., Greenbelt, MD (US)

( * ) Notice: Subject to any disclaimer, the term of this patent is extended or adjusted under 35 U.S.C. 154(b) by 678 days.

(21) Appl. No.: 13/791,443

(22) Filed: Mar. 8, 2013

(65) Prior Publication Data
US 2013/0311133 A1 Nov. 21, 2013

Related U.S. Application Data

(60) Provisional application No. 61/649,178, filed on May 18, 2012.

(51) Int. Cl.
*G06F 17/10* (2006.01)
*G01P 15/00* (2006.01)
(Continued)

(52) U.S. Cl.
CPC ......... *G01C 22/006* (2013.01); *G01C 25/005* (2013.01); *G06F 17/10* (2013.01);
(Continued)

(58) Field of Classification Search
CPC ...... G01C 22/00; G01C 25/00; G01C 25/005;
G01C 22/006; G01C 21/10; G01P 15/00;
G01P 15/001; G01P 15/003; G01P 15/14;
G01P 15/16; G01P 15/165; G01P 15/135;
G01P 15/18; G01P 21/00; G01P 21/08;
G01P 21/10; G06F 17/00; G06F 17/10
(Continued)

(56) References Cited

U.S. PATENT DOCUMENTS 7,463,997 B2   12/2008  Pasolini et al.
7,959,539 B2    6/2011  Takeishi et al.
(Continued)

FOREIGN PATENT DOCUMENTS

EP   1253404 A2   10/2002
EP   1770370 A2    4/2007

OTHER PUBLICATIONS

U.S. Appl. No. 61/649,178, filed May 18, 2012, Kordari et al.
(Continued)

*Primary Examiner* — Gregory J Toatley, Jr.
*Assistant Examiner* — Lynda Dinh
(74) *Attorney, Agent, or Firm* — Baker & Hostetler LLP

(57) ABSTRACT

A method for detecting a human's steps and estimating the horizontal translation direction and scaling of the resulting motion relative to an inertial sensor is described. When a pedestrian takes a sequence of steps the displacement can be decomposed into a sequence of rotations and translations over each step. A translation is the change in the location of pedestrian's center of mass and a rotation is the change along z-axis of the pedestrian's orientation. A translation can be described by a vector and a rotation by an angle.

24 Claims, 12 Drawing Sheets

(51) Int. Cl.
*G01C 22/00* (2006.01)
*G01C 25/00* (2006.01)
*G01C 21/10* (2006.01)

(52) U.S. Cl.
CPC .............. *G01C 21/10* (2013.01); *G01C 22/00* (2013.01); *G01P 15/00* (2013.01)

(58) Field of Classification Search
USPC ........................................................ 702/160
See application file for complete search history.

(56) References Cited

U.S. PATENT DOCUMENTS

| | | |
|---|---|---|
| 2003/0144763 A1 | 7/2003 | Mori et al. |
| 2005/0033200 A1 | 2/2005 | Soehren et al. |
| 2007/0032748 A1 | 2/2007 | McNeil et al. |
| 2008/0077326 A1 | 3/2008 | Funk et al. |
| 2008/0190202 A1 | 8/2008 | Kulach et al. |
| 2009/0012433 A1 | 1/2009 | Fernstrom et al. |
| 2009/0259424 A1 | 10/2009 | Dutta et al. |
| 2011/0071785 A1 | 3/2011 | Heath |
| 2011/0237945 A1 | 9/2011 | Foroughl et al. |
| 2011/0264393 A1 | 10/2011 | An et al. |
| 2012/0068927 A1 | 3/2012 | Poston et al. |
| 2012/0072166 A1 | 3/2012 | Keal et al. |
| 2012/0123569 A1 | 5/2012 | Prstojevich |
| 2012/0136573 A1 | 5/2012 | Janardhanan et al. |
| 2013/0311134 A1 | 11/2013 | Kordari et al. |

OTHER PUBLICATIONS

Chau; "A Review of Analytical Techniques for Gait Data. Part 1: Fuzzy, Statistical and Fractal Methods"; Gait and Posture; 2001; 13; p. 49-66.

Chau; "A Review of Analytical Techniques for Gait Data. Part 2: Neural Network and Wavelet Methods"; Gait and Posture; 2001; 13; p. 102-120.

Fang et al.; Design of Wireless Assisted Pedestrian Dead Reckoning System—The NavMote Experience; IEEE Transactions on Instrumentation and Measurement; Dec. 2005; 54(6); p. 2342-2358.

Godha et al.; Integrated GPS/INS System for Pedestrian Navigation in a Signal Degraded Environment; ION GNSS, Fort Worth, Texas; Sep. 2006; p. 1-14.

Judd; "A Personal Dead Reckoning Module"; ION GPS; 1997; p. 1-5.

Ladetto; On Foot Navigation: Continuous Step Calibration Using Both Complementary Recursive Predictions and Adaptive Kalman Filtering; ION GPS; 2000; 1-6.

Ladetto et al.; "Digital Magnetic Compass and Gryoscope for Dismounted Soldier Position and Navigation"; In Military Capabilities enabled by Advances in Navigation Sensors, Sensors & Electronics Technology Panel; NATO-RTO meeting; Instanbul, Turkey; 2002; p. 1-22.

Lee et al.; "Recognition of Walking Behaviors for Pedestrian Navigatin"; IEEE Conference on Control Applications; Mexico City, Mexico; 2001; p. 1-4.

Soehren et al.; "Prototype Personal Navigation System"; IEEE A&E Systems Magazine; Apr. 2008; p. 10-18.

Hu et al.; "Human Gait Estimation Using a Reduced Number of Accelerometers"; Aug. 2010; Sice Annual Conference; p. 1905-1909.

European Patent Application No. 13828052.4; Extended Search Report; dated Mar. 7, 2016; 14 pages.

Alvarez et al.; "Comparison of Step Length Estimators from Wearable Accelerometer Devices"; Proceedings of the 28th IEEE EMBS Annual Int'l Conf.; 2006; p. 5964-5967.

Shih et al.; "Estimating walking distance with a smart phone"; Fifth Int'l Symposium of Parallel Architectures, Algorithms and Programming; 2012; p. 166-171.

ded by a vector and a rotation by an angle. The cumulative rotation over a path is computed using gyro information. The method can use only accelerometer signals and works robustly with a torso mounted location.

METHOD FOR STEP DETECTION AND GAIT DIRECTION ESTIMATION

CROSS-REFERENCES TO RELATED APPLICATIONS

This application claims benefit under 35 U.S.C. § 119(e) of Provisional Patent Application No. 61/649,178 filed May 18, 2012, the contents of which is incorporated herein by reference in its entirety.

STATEMENTS AS TO THE RIGHTS TO INVENTIONS MADE UNDER FEDERALLY SPONSORED RESEARCH OR DEVELOPMENT

This invention was made with government support under W31P4Q-12-C-0043, awarded by the Defense Advanced Research Project Agency (DARPA) Special Project Office. The Government has certain rights in the invention.

BRIEF DESCRIPTION

A method is described for detecting a human's steps and estimating the horizontal translation direction and scaling of the resulting motion relative to an inertial sensor, regardless of or in spite of a changing torso mounting location. When a pedestrian takes a sequence of steps, the displacement can be decomposed into a sequence of rotations and translations over each step. A translation is the change in the location of the pedestrian's center of mass and a rotation is the change along the z-axis of the pedestrian's orientation. A translation can be described by a vector and a rotation by an angle. The cumulative rotation over a path is computed using gyro information. The method can use only accelerometer signals and works robustly with a torso mounted location.

REFERENCE TO A "SEQUENCE LISTING," A TABLE, OR A COMPUTER PROGRAM LISTING APPENDIX SUBMITTED ON A COMPACT DISK

Not Applicable.

COMPUTER PROGRAM LISTING

A listing of source code is provided in Appendix A.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Torso-mounted inertial sensors are typically attached at the waist and centered in the front or in the back in order to be closest to the center of gravity where there is less extraneous motion. Other mounting locations, such as in a vest pocket are feasible but they change the character of the motion signatures. Moving a system designed for waist mounting to another location on the body can cause performance issues depending on the motion models.

Torso-mounted inertial tracking systems that use microelectromechanical system (MEMS) sensors are typically developed as a pedometer based systems (though this is not always the case if additional velocity sensors are available to provide corrections).

The simplest of the pedometer type systems detects each step and uses a fixed predefined step length to compute the distance travelled, assuming all motions are walking or running forward. See, Judd, T. *A Personal Dead Reckoning Module*, in *ION GPS*. 1997. Kansas City, Mo. This type of system provides adequate performance for runners and other athletes with an approximately fixed pace attempting to record some measure of their workout distance.

Step detection is a critical function in any pedometer system. FIG. 1 shows typical raw z-axis accelerometer data from a waist mounted sensor for a person going up a series of steps. A circle mark at the bottom of each of the accelerometer signals indicates a heel strike associated with each step, which is based on a local minima in the accelerometer data. While one might expect that the magnitude of the signal would be consistent when performing uniform motions, it is clear from this sample that there can be significant magnitude variation in the acceleration while going up steps. As illustrated in FIG. 2, that variation can be even more extreme over different motions. If the variation in magnitude is significant, it can cause issues with missed detections because, for example, in order to eliminate false detections, values less than a threshold may be ignored. This may cause a simple detector to miss soft steps.

For example, FIG. 2 shows typical three axis accelerometer data taken while walking in an office building. The x-axis data is illustrated by a dash-dot-dot line, which is largely obscured by the y-axis data which is shown as a solid line. The z-axis data is illustrated by a dash-dash line. The data collected and illustrated in FIG. 2 was collected while a subject walked down 4 flights of stairs, down a hallway, and up 4 flights of stairs. A visual inspection of this accelerometer data suggests the ability to differentiate between walking down stairs, upstairs and forward based on signal characteristics, as indicated in FIG. 2.

More sophisticated pedometers include motion models to better estimate step length. In the context of pedestrian tracking, the motion models typically referred to in the literature describe motion type (walking, running, crawling . . . ) and step length and frequency. See, id.; Funk, B., et al., *Method and System for Locating and Monitoring First Responders*, U.S. Publication Number 2008/0077326 ("Funk").

For example, step length can be estimated based on a tracked subject's height, step frequency, and other factors. In general, for walking, the speed and step length increase when the step frequency increases, and for a given step frequency, step length remains fairly constant (with some distribution about a nominal value). Considering the human body's locomotion and physical restrictions, different methods have been proposed to approximate the step length. Linear models have been derived by fitting a linear combination of step frequency and measured acceleration magnitude to the captured data. Pedometer systems may also provide a mechanism for using GPS or other measures to adaptively update the step length estimates. See, Ladetto, Q., *On foot navigation: continuous step calibration using both complementary recursive prediction and adaptive Kalman filtering*, in *ION GPS*. 2000; Lee, S. and K. Mase, *Recognition of Walking Behaviors for Pedestrian Navigation*, in *IEEE Conference on Control Applications (CCA01)*. 2001: Mexico City, Mexico; Fang, L., et al., *Design of a Wireless*

Assisted Pedestrian Dead Reckoning System—The NavMote Experience. IEEE Transactions on Instrumentation and Measurement, 2005. 54(6): p. 2342-2358; Ladetto, Q., et al. *Digital Magnetic Compass and Gyroscope for Dismounted Solider Position and Navigation*, in *Military Capabilities enabled by Advances in Navigation Sensors, Sensors & Electronics Technology Panel, NATO-RTO meetings*. 2002. Istanbul, Turkey ("Ladetto"); Godha, S., G. Lachapelle, and M. Cannon, *Integrated GPS/INS System for Pedestrian Navigation in a Signal Degraded Environment*. in *ION GNSS*. 2006. Fort Worth, Tex.: ION.

In Chau, T., *A Review of Analytical Techniques for Gait Data. Part 1: Fuzzy, Statistical and Fractal Methods*. Gait and Posture, 2001. 13: p. 49-66 and Chau, T., *A Review of Analytical Techniques for Gait Data. Part 2: Neural Network and Wavelet Methods*. Gait and Posture, 2001. 13: p. 102-120, a review of analytical techniques is presented. The techniques have the potential for a step data analysis, including Fuzzy Logic (FL), statistical, fractal, wavelet, and Artificial Neural Network (ANN) methods.

In order to account for motion direction, pedometers may break the tracking problem down into motion classification and then scaling, not assuming, for example, that every motion is forward. They provide a mechanism to classify the motions as forward, backward, up, down, left, right, etc. See. Funk; Ladetto; and Soehren, W. and W. Hawkinson, *Prototype Personal Navigation System*. IEEE A&E SYSTEMS MAGAZINE, 2008 (April) ("Soehren"). While prior claims have been made regarding the ability to classify motion based on comparison with stored motion data or to use neural networks to classify motion, little detail, and certainly not enabling disclosures have been provided regarding how this is done. Aside from the use of vision systems for classification, published work on motion classification is limited. Ladetto suggests using the antero-posterior acceleration divided by the lateral acceleration as an indicator of direction together with the lateral acceleration data peak angles to determine left versus right side stepping. Soehren uses an abrupt change in step frequency to detect walking versus running. Funk describes a neural network classification method where sensor data is segmented into steps and then normalized (re-sampled) to make a consistent number of inputs to the neural network classifier that is independent of step frequency. This method has been used to classify standard pedestrian motions as well as more utilitarian job related motions such as crawling and climbing ladders.

DETAILED DESCRIPTION OF ILLUSTRATIVE EMBODIMENTS

A method for estimating hip elevation and using that estimate for step detection and scaling based on the extrema of the estimated hip elevation has been developed. The relative translation direction for each step may also be computed.

When a pedestrian wearing an accelerometer device takes a sequence of steps, the displacement of the devices and therefore the pedestrian may be decomposed into a sequence of rotations and translations over each step. A translation is the change in the location of pedestrian's center of mass and a rotation is the change along z-axis of the pedestrian's orientation. A translation may be described by a vector and a rotation may be described by an angle.

In an embodiment, translations may be computed using only accelerometer signals. Rotations may be computed using gyro heading information. The algorithm of the embodiment has been demonstrated to be robust to torso mounting location. The computer program listings of Appendix A illustrate an embodiment of source code instructions for an algorithm which may be implemented in a computer system including a non-transient memory and a storage system for storing instructions for implementing the source code instructions, a central processing unit for executing those instructions, and input/output systems for receiving input and other instructions and outputting results and displaying data. The source code instructions set forth in Appendix A, which are incorporated herein by reference in their entirety, are as follows:

| File Name |
| --- |
| hipStepDetector_header |
| hipStepDetector |
| neuralNet2_header |
| neuralNet2 |
| neuralNET4GWeights |
| tracker2 |

The steps of the algorithm illustrated in the source code instructions are as follows (if not otherwise stated, calculated or processed data is stored in memory for subsequent use):

Sample 3-axis accelerometer data. In this embodiment, the sampling frequency tested was $f_s=40$ Hz but any frequency above twice the Nyquist frequency for the motion will work. Once the accelerometer data is collected from the device, which may include a smartphone type device, the accelerometer data is stored in the non-transitory memory of a computer having a processor.

Figure 1:
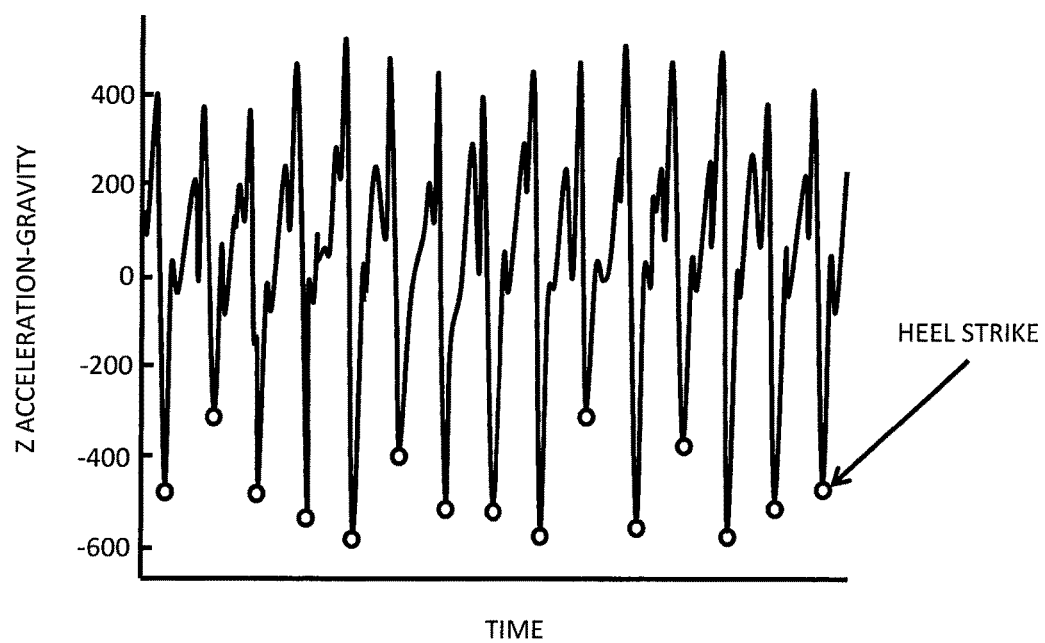
FIG. 1 is an illustration plotting z-axis accelerometer signals over time with heel strikes indicated.
Figure 2:
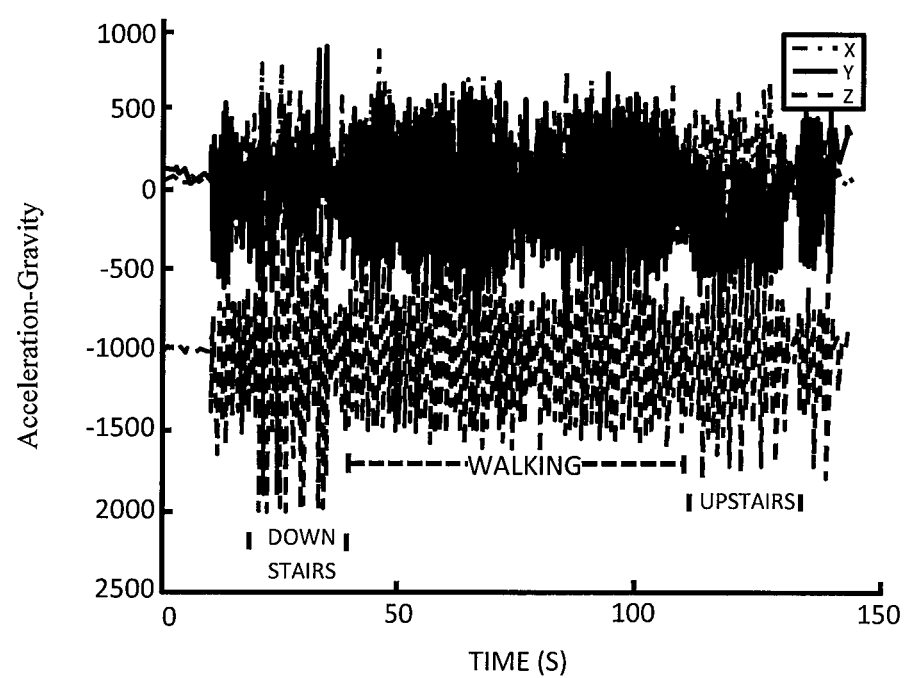
FIG. 2 is an illustration of raw accelerometer signals from x, y and z-axis during typical pedestrian motions.
Figure 3:
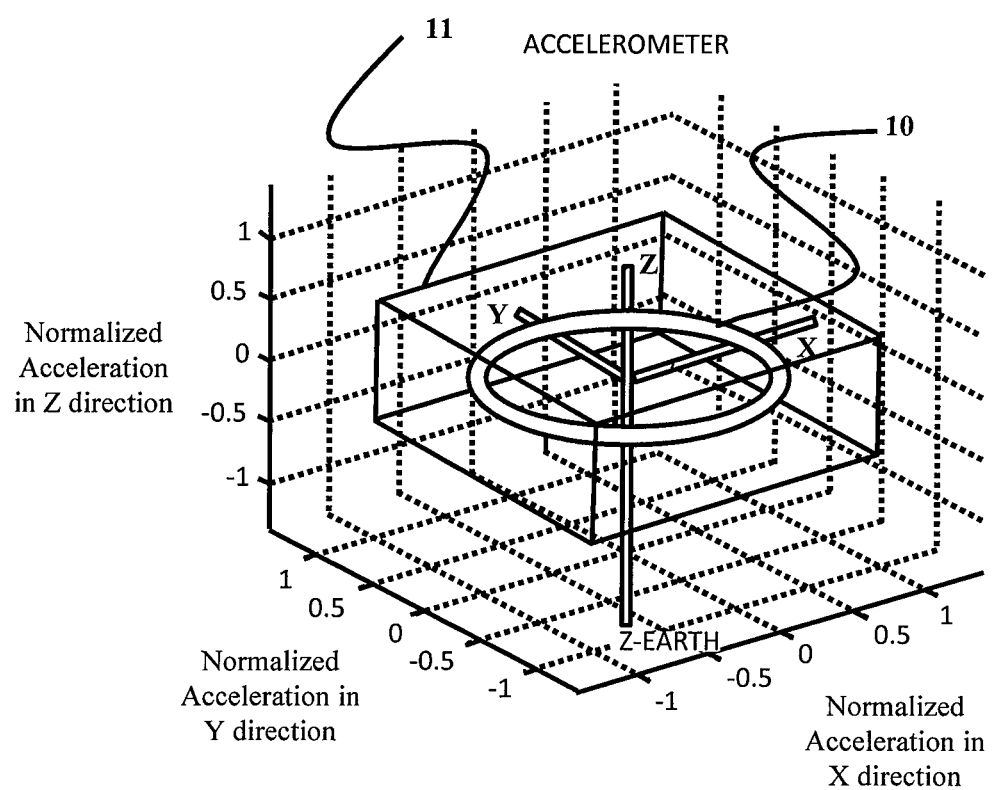
FIG. 3 is an illustration of accelerometer orientation.

As illustrated in FIG. 3, the accelerometer device, represented by the ring 10, is oriented within the navigation frame 11, such that the z-axis is up and down from the device, the x-axis points to the right and left of the unit device the y-axis points forward and backward from the device. If the accelerometer device is tilted from this navigation or ground frame (often there is a slight tilt when people are walking), a method of removing tilt must be implemented. Assuming zero (or near zero) non-gravitational acceleration, the accelerometer data can be used to obtain a noisy measurement of pitch (pitch data) and roll (roll data) relative to the ground frame based on the x-axis, y-axis and z-axis data from the device. Tilt data can then be removed using only the accelerometer's input of x-axis, y-axis and z-axis data. The accelerometer data with the tilt data removed is referred to as first improved accelerometer data, which is then stored in the non-transitory memory. More reliable tilt compensation is possible if x-axis, y-axis and z-axis data from a 3-axis gyroscope in the device is also available. In this embodiment, the orientation filter described below, which uses both accelerometer and gyro information was used to remove tilt.

Once oriented in the navigation frame, established by the first improved accelerometer data, gravitational acceleration can be removed from the z-axis acceleration as follows:

$$\bar{a}_z = a_z - g$$

where $a_z$ is improved accelerometer data for the z-axis, g is gravity, and $\bar{a}_z$ is improved accelerometer data for the z-axis minus gravitational acceleration.

Pass the sampled accelerometer data ($a_x$, $a_y$, $\bar{a}_z$) through a band pass filter to remove any additional bias and high frequency noise. In this embodiment, the band pass filter has a low frequency cutoff at 0.02 Hz and high frequency cutoff at 4 Hz; however, any filter that removes bias and high frequency noise is sufficient.

Compute the hip elevation estimate by double integrating the filtered z accelerometer data as follows:

$$h_e = -\iint \bar{a}_z$$

The integral is negated since it is desirable to have the hip elevation increase in the positive z-axis direction (i.e., up).

Zero the mean. The hip elevation should be a periodic function about some mean elevation. Because of noise, bias or other errors in the accelerometer signal the hip elevation estimate may drift away from the mean. A method for drift removal must be implemented. In this embodiment, the mean was removed from the recent hip elevation data buffer each time a new value a computed. The buffer of recent points in this embodiment is 128.

Figure 4:
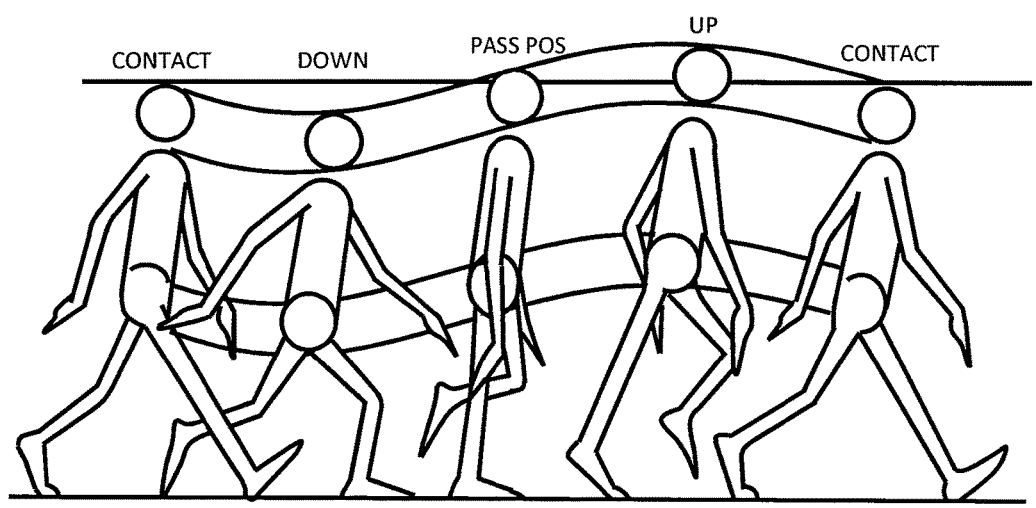
FIG. 4 is an illustration of hip motion over a stride.

Find the extrema (i.e., local minima and local maxima). Each local minimum marks a step. As illustrated in FIG. 4, the local minima occur, indicated by the figure labeled as "down", slightly after each heel strike, indicated by the figure labeled as "contact". The local maxima occur, indicated by the figure labeled as "up", slightly after a passive position, indicated by the figure labeled as "pass pos". Smoothing the signal prior to finding the extrema can reduce extraneous detections. In this embodiment, to reduce extraneous detections, a test is performed to determine that there are no neighboring minima (minima other than local minima) within a 21 sample window including 10 samples before and 10 samples after. Sample windows of other sizes with n samples before and n samples after each local minima could also be used. If any neighboring minima are detected within the sample window, the neighboring minima are not counted as local minima.

Classification: a three gait neural network classifier classifies the gait into one of these classes:
1. Level (moving in the horizontal plane—2D)
2. Up (stairs, ramp, etc.)
3. Down (stairs, ramp, etc.)

While no movement or "garbage" movement is not a neural network class, a garbage gait is determined in a separate process to denote motion that does not produce displacement (if it does not satisfy certain criteria then it is considered garbage). For example, running in place would be garbage motion. The neural net used in this embodiment is a feed-forward back propagation network that has 2 hidden layers, as further illustrated in Table 1.

TABLE 1

| Layer | Number of nodes |
|---|---|
| Input | 67 |
| Hidden layer 1 | 40 |
| Hidden layer 2 | 24 |
| Output | 3 |

The inputs to the neural net should be chosen so they are invariant to motion speed, amplitude, and quickly capture changes in the subject's motion. Also the inputs should be normalized so that no input is inadvertently weighted more than another value. To accomplish this, classification is done on a per step basis. The sensor data taken over each step is re-sampled to provide 10 values regardless of the motion speed over the step. The data for each input value is normalized to be between +1 and −1 by referencing a very large data set of human motion data and determining the range for each input value. The inputs to the neural network are as follows: Once a step is detected, the tilt compensated (navigation frame) angular velocity and acceleration values are integrated over the step to produce a sequence of angle and velocity vectors. The angle, velocity and acceleration vectors are then normalized and re-sampled to give ten values each for the x, y, and z components of the angle ($\Theta_x$, $\Theta_y$, $\Theta_z$) and velocity ($v_x$, $v_y$, $v_z$). These are the first 60 inputs noted in Table 1. The subsequent seven inputs noted in Table 1 are the acceleration amplitude difference over the step, $\max(a_x)-\min(a_x)$, $\max(a_y)-\min(a_y)$, $\max(a_z)-\min(a_z)$, the posture vector ($p_x$, $p_y$, $p_z$) (i.e. orientation vector) at the end of the step, and the index where magnitude of the x y plane acceleration, $\sqrt{a_x^2+a_y^2}$, achieves its minimum value. These set of input signals were selected by testing different combination of input data and selecting the data set that produced the best classification accuracy. The tested signals included acceleration, velocity, displacement, angular velocity, and angle vectors as well as their amplitudes, means, variances, and sliding windowed variances.

In the time interval between the local minima (short time after heel strike) and following maxima (mid stride), integrate filtered x and y acceleration to find the displacement in the x and y directions for each step $$d_x = \iint a_x$$

$$d_y = \iint a_y$$

Note that, for the use in finding movement direction, it is not necessary to integrate over the entire interval as long as $a_x$ and $a_y$ are integrated over the same interval.

The translation direction, D, for each step is computed as $$D = \tan^{-1}(d_y/d_x)$$

where 90 degrees is forward, 0 is side right, −90 is backward and 180 is side left. The movement direction can assume all other possibilities between these four cardinal directions.

Figure 5:
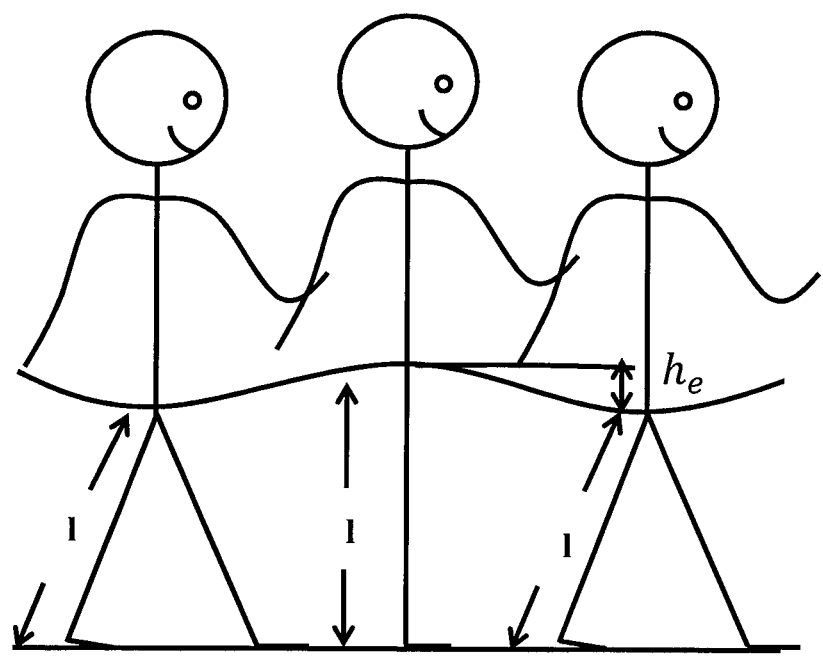
FIG. 5 is an illustration of a stride model showing hip elevation change.

The 2D movement displacement (stride length) is calculated as a function of the change in hip elevation between the minima and maxima of hip elevation $h_e$. If a simplistic stride model is assumed, as is illustrated in FIG. 5, in which the legs (length l) form the sides of an isosceles triangle when in full stride, the change in hip elevation $h_e$ is related to the stride length by:

$$\text{stride} = 2\sqrt{l^2-(l-h_e)^2}$$

Realistic walking models are slightly more complex, such as is illustrated by FIG. 4. Other stride length models are possible without assuming any knowledge of the subject's leg length. For example, since $d_x$ and $d_y$ are x and y movement computed across a portion of the stride, another possible stride estimate would be:

$$\text{stride}=k\|d_x,d_y\|$$

where k is a coefficient that must be estimated, in this case where the integration interval is between the local minima and following maxima, the distance is about half a stride so k should be approximately equal to 2. In the embodiment, it is assumed there is no access to leg length so a linear function of the change in hip elevation between the minima and maxima of hip elevation is assumed as follows:

$$\text{stride}=kh_e$$

In the embodiment, k=0.2 millimeters meter was used and produced good results.

If the gait is classified as up or down, then elevation change is calculated based on pressure change.

The accelerometer based translation direction computation is complementary to a gyroscope heading; it does not capture standard turns (rotation about the z axis). To produce a complete path, the gyro heading is computed, in this embodiment, by summing the changes in angular velocity and adding them to the initial heading, which is then added to the translation direction.

The path is updated by applying the displacement vector in the computed heading direction and the elevation change to the last point of the path and adding the new point to the path.

Classification of sub-gaits: moving in 2D space is broken down to 6 sub-gaits, (1) forward (2) backward (3) side right (4) side left (5) run (6) garbage, by characterizing each gait based on the moving direction and other quantities that are descriptive of these sub-gaits (e.g. variances, mean, magnitude, and difference in inertial data: including acceleration, velocity, displacement, angular velocity, and angle over the time window step was happening). These sub-gaits are not considered when updating the path location, but are reported in by the algorithm.

A reliability measure is associated with each estimate based on identifying reasonable human motion constraints on angle, hip elevation and distance traveled over each step. For example, the change in angle along x-direction should be bounded within a reasonable range. For each constraint that is not met, the reliability of the estimate is lowered. The goal in computing reliability is to provide a method to determine if the subject's motion is causing the subject to change location (for example, not just swaying back and forth). In the embodiment, if three constraints are not met, the stride length is set to zero.

There are two main sources of error in the computation of movement direction that enter into pedometer based inertial tracking systems.

1. Movement in a relative direction that is not handled by the classifier (and not captured by a gyroscope or compass); and
2. Placement of the inertial sensors in an orientation other than what is assumed.

These types of errors are difficult to correct with a compass or gyro without information on the true heading because they are caused by either translation of the sensor without change in sensor orientation or erroneous initialization assumptions.

Movement direction errors are caused by limiting the possible directions of motion relative to the sensor. For example, if a mechanism is provided only to classify the motions as forward, backward, left, or right (relative to the heading of the sensor), this classification of the motion into four possible cardinal directions leaves room for error. In this case, if the person is walking sideways but their body oriented at 45 degrees to the direction of travel, the motion direction computed would be incorrect since the motion relative to the sensor would be 45 degrees. As described below, the embodiment enables estimate of any movement direction regardless of the sensor orientation.

It is typical with pedometer tracking systems to assume a placement location and orientation of the inertial sensor. Given this information, when movement is computed it is relative to this orientation so if the placement assumption is incorrect, errors are introduced. For example, if a waist mounted inertial sensor was expected to be centered, but in fact was shifted off to the left or right by a few degrees, the movement for each step would have a heading error equal to the amount of the offset. As described below, the embodiment provides a mechanism for detection of the offset position.

The tests described below and with reference to FIGS. 6 and 7 show performance of the algorithm in correcting movement direction errors. The data shown is for a single subject, but tests have been performed using the same algorithm with different subjects with similar results. The step detection shows an ability to accurately track slow/soft movements as well as motions that do not fit into the set of classified motions.

Figure 6A:
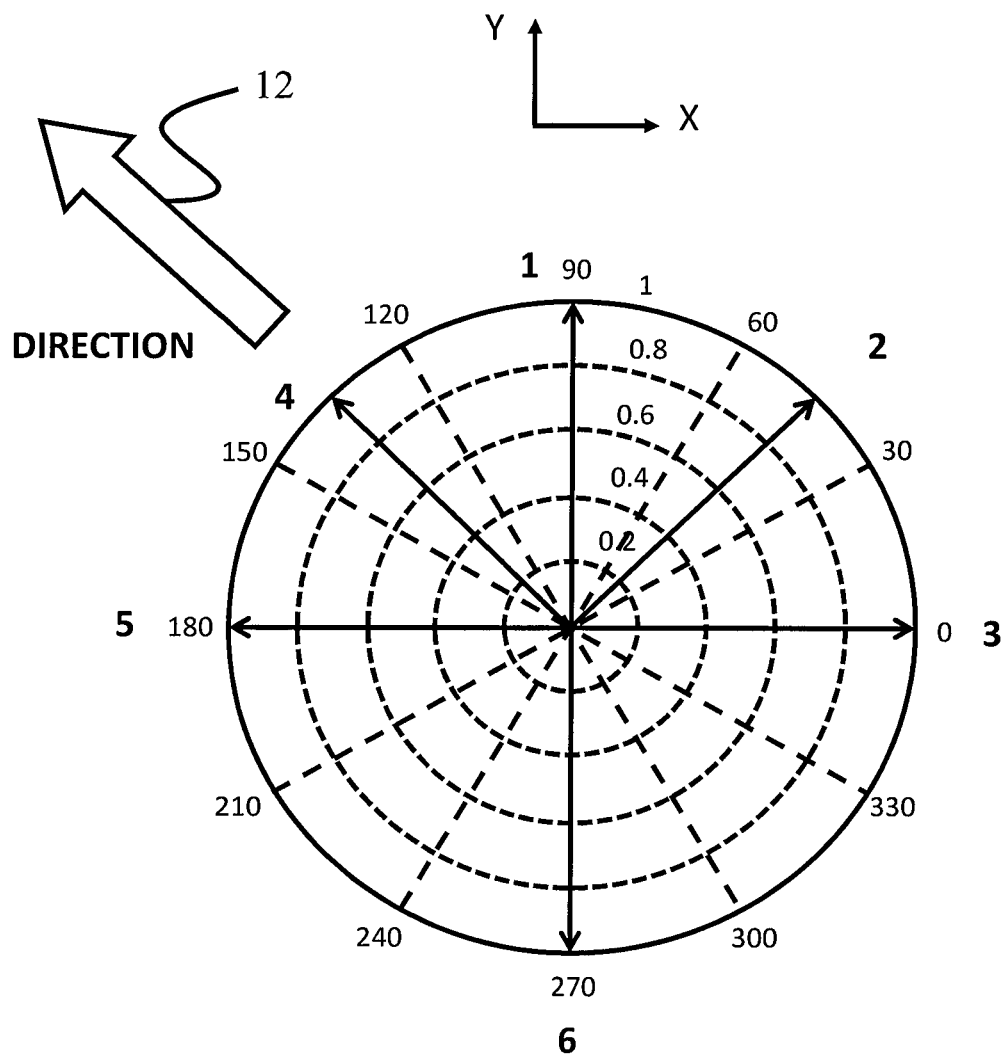
FIGS. 6A and 6B are illustrations of a relative direction of motion test setup and the corresponding results.
Figure 6B:
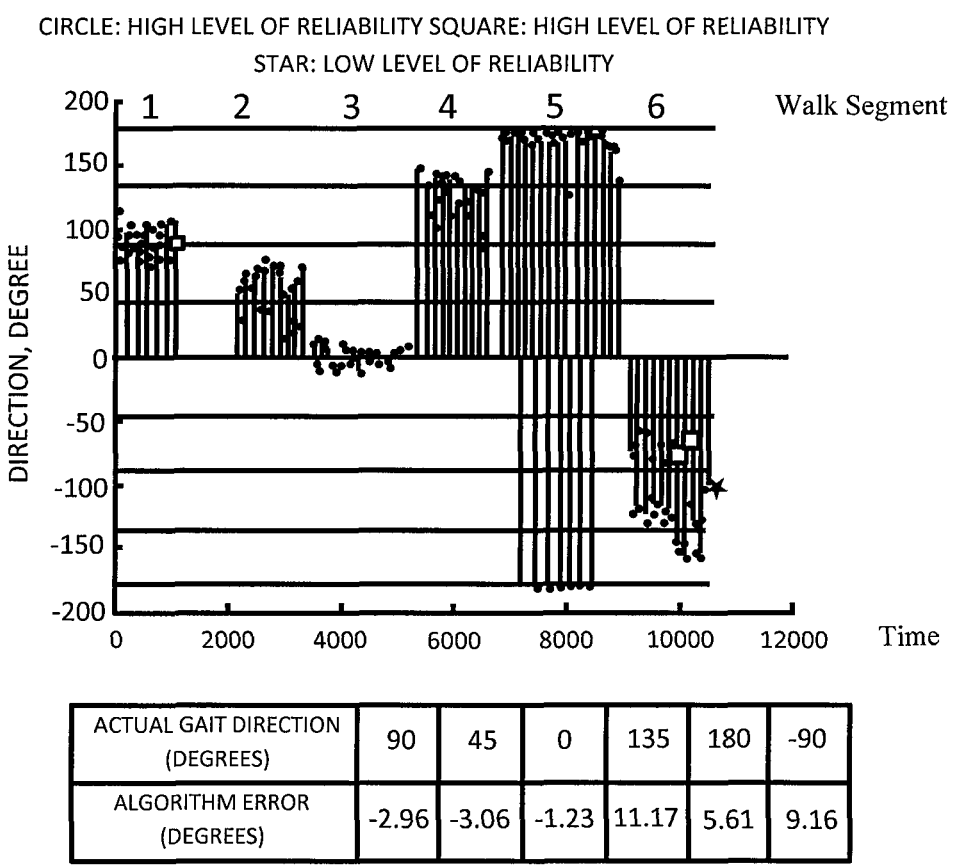

In the tests, the subject wears the inertial sensor at the waist positioned center front. The subject moves in different directions but maintains a fixed orientation (facing the same direction 12) throughout the test. The algorithm is able to compute the relative direction of movement using the algorithm described above. FIG. 6A shows a top view (overhead) of the placement of the inertial sensor and relative heading directions that are tested, and each of six consecutively numbered actual gait directions (1—90 degrees, 2—45 degrees, 3—0 degrees, 4—135 degrees, 5—180 degrees and 6—270 degrees). FIG. 6B shows the results of the algorithm's estimate of the direction for each step over time, with the horizontal lines of the graph indicating the direction degree and the end points of the vertical lines showing approximate directions (−180, −135, −90 (270), −45, 0, 45, 90, 135, 180) that are detected. Most of the end points of the vertical lines are circles or squares, indicating a high level of reliability, but one star indicates a low level of reliability.

The test procedure was as follows: With the body facing in a fixed direction 12, the subject walks for 35 meters forward (1—90 degrees), then still facing in the same direction 12, the subject moves at 45 degrees (2—45 degrees), then walks sideways to the right (3—0 degrees). Maintaining the same facing direction 12, the subject walks at an angle between forward and side left (4—135 degrees), then walks sideway left (5—180 degrees), and finally walks backward (6—270 degrees). The table in FIG. 6B reports the resulting algorithm error in terms of degrees, with the average error over the test estimated to be 5.5 degrees.

Note that because the subject is facing in a constant direction but moving in different directions, a gyroscope would indicate a relatively fixed heading throughout the test. The tracking algorithm may combine this new motion information from the accelerometer with any gyro-compass tracking algorithm to provide improved 2-D motion estimation without the need for complex motion classifiers that are affected by mounting position.

Figure 7A:
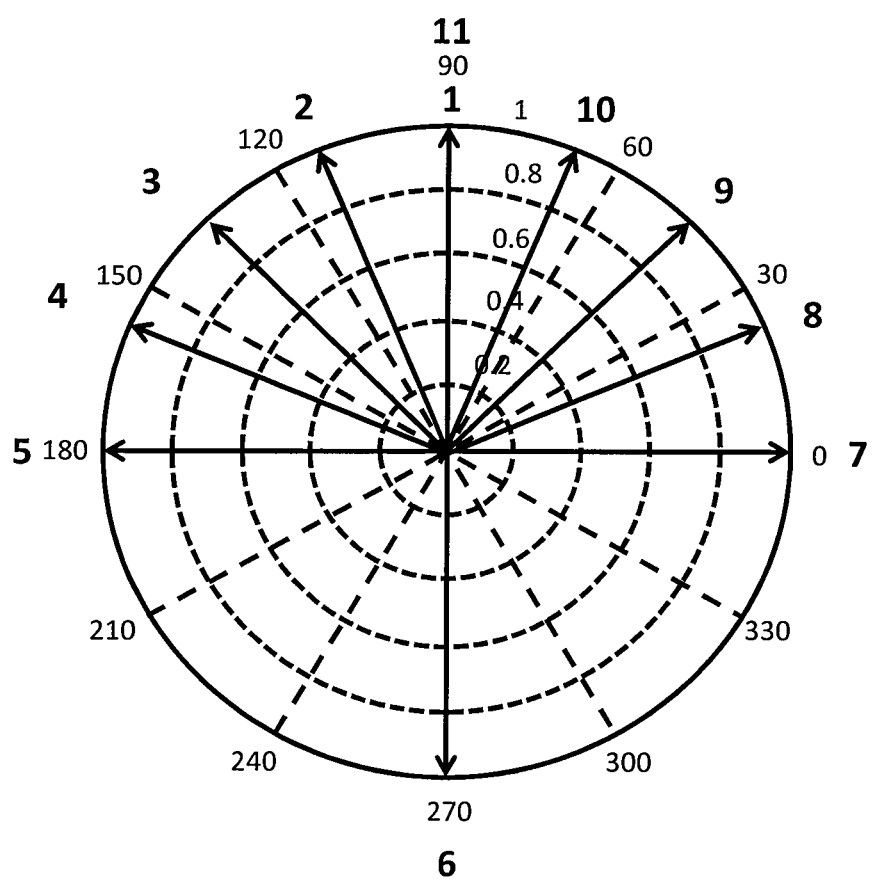
FIGS. 7A and 7B are illustrations of a sensor offset detection test setup and corresponding results.
Figure 7B:
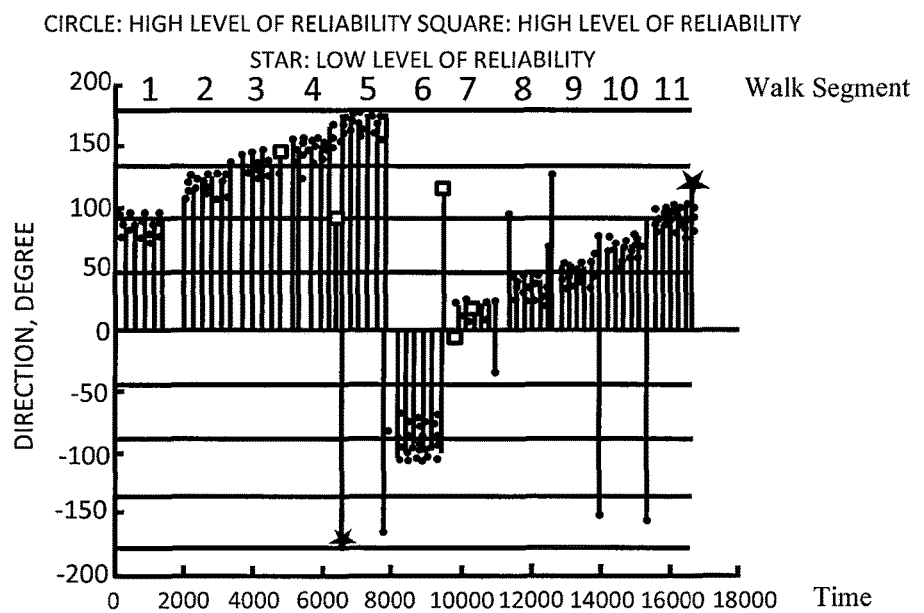

In a second test related to determining sensor orientation, the subject wears the inertial sensor at varying positions around the waist while walking forward. The algorithm is able to compute the orientation of the sensor with respect to the direction of movement. This may be done using the identical algorithm used to compute the relative direction of movement as above. In this case, the algorithm would have to detect that the subject was walking forward (perhaps with another classification algorithm) or make an assumption that the majority of motions would be forward in order to compute the offset. As illustrated in FIG. 7A, an overhead view of the placement of the inertial sensor is again shown, and each of eleven numbered forward directions are noted (1—90 degrees, 2—112.5 degrees, 3—135 degrees, 4—157.5 degrees, 5—180 degrees, 6—270 degrees, 7—0 degrees, 8—22.5 degrees, 9—45 degrees, 10—67.5 degrees and 11—90 degrees. FIG. 7B shows the results of the algorithm's estimate of the offset for each step over time. Again, the horizontal lines of the graph indicate the direction degree and the end points of the vertical lines showing approximate directions (−180, −135, −90 (270), −45, 0, 45, 90, 135, 180) that are detected. Most of the end points of the vertical lines are circles or squares, indicating a high level of reliability, but stars indicates a low level of reliability.

The test procedure was as follows: The inertial sensor starting position is center front, FIG. 7A (1—90 degrees). The subject then walks forward 35 meters, the inertial sensor is then moved slightly to the left of center (2—112.5 degrees), again the subject walks forward 35 meters. The inertial sensor is then successively moved again to locations 3, 4, 5, 6, 7, 8, 9, 10 and back to 11 at 90 degrees, the center front starting position, with the subject walking forward 35 meters from each position. In this test the locations are approximated based on the assumption that the person wearing the inertial sensor is a cylinder, which clearly they are not. As illustrated in the table of FIG. 7B, because of the placement uncertainty, the average error over the test is estimated to be 9.2 degrees, which is slightly higher than the previous test.

The step detection and gait direction estimation embodiments disclosed herein can also be extended for continuous tracking using a handheld or body-mounted sensor unit (such as a smartphone), without assuming an initial orientation and allowing for orientation transitions (i.e., answering a phone) during tracking. The only assumptions made are that 1. The majority of steps are in the forward direction, and
2. The tilt-compensated yaw orientation between the sensor unit and the person's being tracked forward direction do not change unless transitioning.

Upon initialization of the sensor unit in an unknown orientation, the orientation filter, described in more detail below with reference to FIGS. 8A-8C, will determine the sensor data in the level frame. This will fix one degree of freedom of the ground/navigation frame (the z-axis), constraining the x-axis and y-axis to lie along the level plane. In order to fix the ground/navigation frame completely, the most frequent direction of translation (assumed to be forward), will be corrected to the y-axis.

In one implementation of an algorithm for calculating the most frequent direction of translation, the possible directions of motion are subdivided into direction bins, and a running average or total of each bin is maintained along with the number of steps in each bin. The most or highest frequented bin's average is considered the forward direction (by assumption). For more reliable detection of forward direction, two separate direction bins should be maintained for even and odd steps. During stable forward gait, even steps will be to one side of the forward direction and odd steps will be to the other. These two directions can then be averaged together to find the forward direction. More sophisticated clustering techniques can also be used to determine the most frequent direction. This "step bias" is subtracted from the translation direction of all steps so that the forward direction of motion will correspond with forward translation. The level filter and most frequent direction of motion completely specify the right-handed navigation frame, allowing for consistent gait direction regardless of orientation as long as the sensor orientation is fairly static relative to the person's forward direction.

Abrupt changes in the orientation of the sensor, such as moving a smartphone to answer it, will change the forward step bias (affecting the translation direction) as well as the accumulated gyro measurement (affecting the rotation direction). These transition periods can be detected by monitoring the orientation over a period of time. If this change exceeds a threshold, then it is the beginning of a transition period. During the transition period, the step bias towards forward no longer applies and the most frequent direction filter must be reset (although steps can still be detected and an estimation of the step bias can be retroactively applied at the end of the transition period). Additionally, since the accumulated measure of rotation with respect to the body can change during this transition, the rotation accumulated until the beginning of the transition period is assumed constant throughout the transition. At the end of the transition period, the navigation frame must once again be established from an unknown orientation and step bias, but after the frame is established (at least one step is needed), the rotation and translation will again be consistent.

An additional class of motion, distinguished from the static handheld/body-mounted class and transition class described above, is periodic movement, such as in a pants pocket or swinging in the hand while walking. This case can be detected by periodicity in the gyroscope sensor data, which can be used for step detection in addition to, or in place of, accelerometer data. By using the gyroscope to extract the step period, a similar procedure as above could be used to detect the relative "swing direction" and allow transitions between all three classes of motion while producing a consistent set of rotations and translations.

Because many inertial measurement units (IMUs) include 3-axis accelerometers and 3-axis gyros, by using knowledge of the gravitational field direction, measurements from the accelerometers may be used to provide drift free redundant estimates of pitch and roll that are very accurate when the person is not moving. Gyroscope and accelerometer measurements may be combined to provide a quaternion based orientation estimate.

Ideally, the gyroscope measurements alone may be sufficient to determine orientation. However, due to sensor imperfection, noise, and bias errors, such estimates rapidly accumulate error. Fortunately, additional orientation information is available via the accelerometer sensors. Assuming the device is at rest on the earth, it will experience 1 g of acceleration in the direction of the center of the earth. This fact constrains the possible device orientations to a plane that fixes the pitch and roll with respect to the earth frame of reference. Yaw information (earth frame) is not available due to the fact that yawing the device will not change the direction of its gravity vector. Yaw information may be corrected using compass when good compass data is available.

Mathematically orientation estimates may be represented as a quaternion (a 4-dimensional vector of real numbers). The quaternion representation is used to avoid the singularities in the Euler angle parameterization when pitch approaches ±90°. As illustrated in FIG. 8A, orientation estimates 22 may be developed based on gyro data 20, such as the angular rate from the gyros, as further illustrated in FIG. 8B, and a tilt estimate computation 24 based on the estimation of the direction of gravity using the accelerometer data 26, as further illustrated in FIG. 8C. This gyro estimate is good over the short term but suffers from bias as well as saturation errors that cannot be compensated without additional information. Assuming zero (or near zero) non gravitational acceleration, the accelerometer data can be used to obtain a noisy measurement of pitch and roll relative to the ground frame. An embodiment includes a method for combining the two estimates in a way that mitigates their inherent drawbacks.

The gyro and accelerometer estimates are formulated as quaternion estimates and the fusion of the estimates is accomplished via a spherical linear interpolation (SLERP). The fusion is done assuming the gyro computed yaw is correct. By combining the two estimates, it is possible to take advantage of the best properties of both measurements. The combined measurement eliminates the unmitigated errors in pitch and roll while smoothing the noisy accelerometer measurement.

Figure 8A:
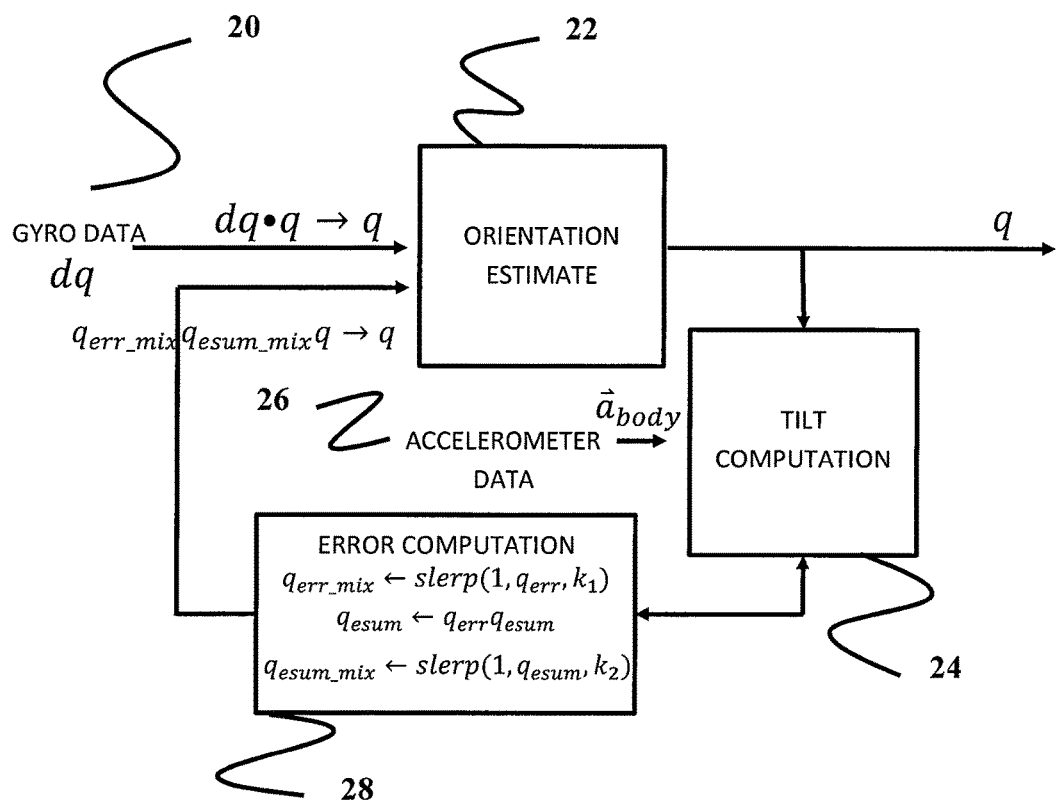
FIG. 8A is a PI implementation of orientation estimator.
Figure 8B:
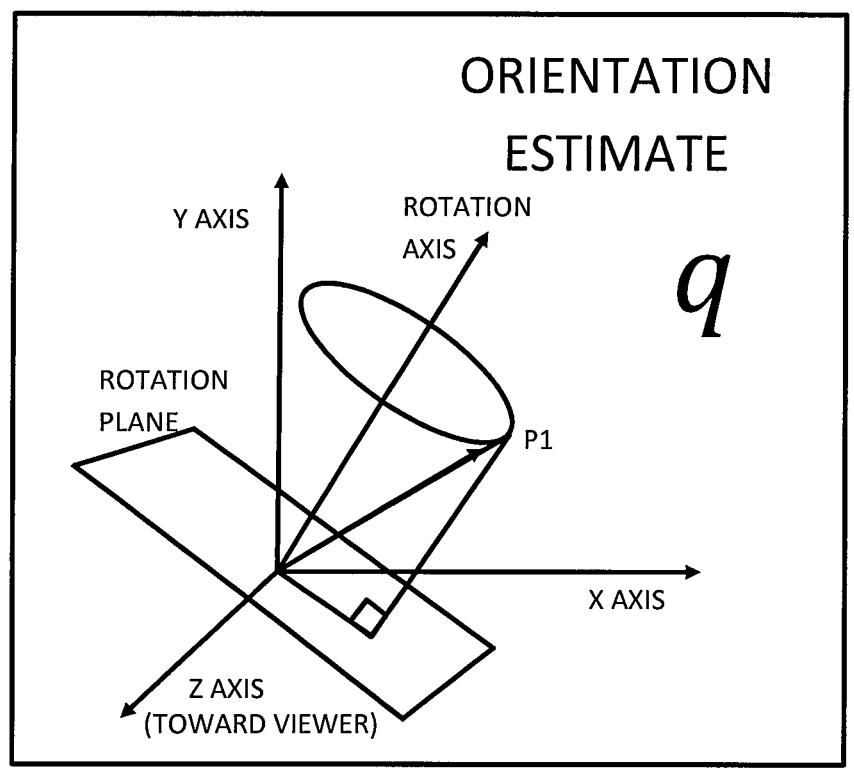
FIG. 8B illustrates the orientation estimate of FIG. 8A.
Figure 8C:
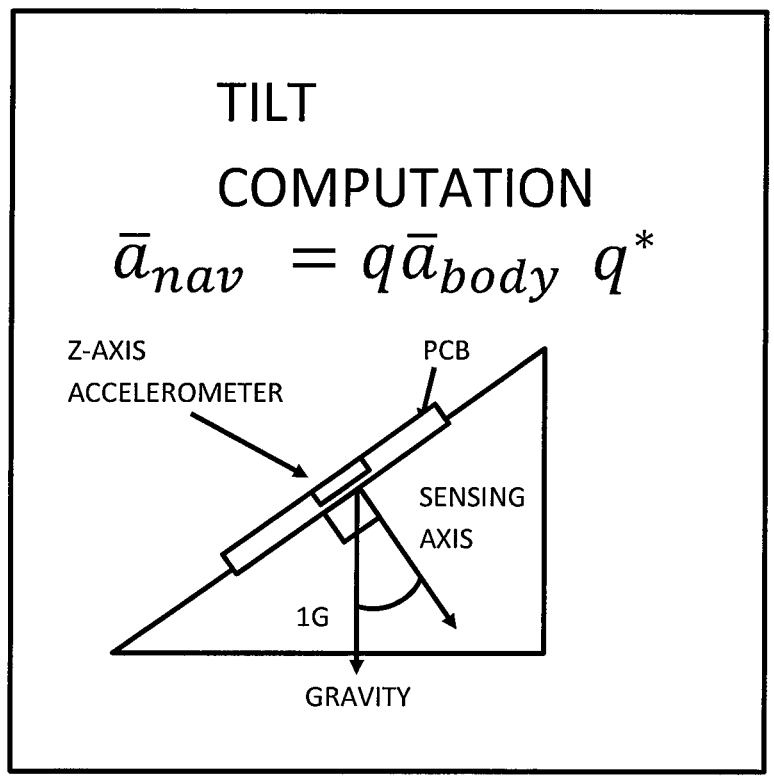
FIG. 8C illustrates the tilt computation of FIG. 8A.

This SLERP combination is formulated in terms of a proportional feedback control loop as illustrated in FIG. 8A. The benefit of the feedback formulation is that well known methods of feedback control can be easily applied. In the embodiment, the accelerometer vector is used to perform an error computation 28 that includes an "error quaternion" and an "error sum quaternion" that are fed back into the orientation estimate 22 update by the gyro measurements 20. In this sense, the implementation is similar to a conventional PI (proportional-integral) controller, except that the proportional and integral terms are quaternions instead of scalars or vectors. The effect of the control is that even if the gyroscopes saturate momentarily because the tracking system has experienced a violent motion, the IMU's attitude estimate will be rapidly corrected.

The filter's state consists of three variables: the orientation estimate q, the "error quaternion" $q_{err}$, and the "error sum quaternion" $q_{sum}$. The filter has two parameters: $k_1$, which is analogous to the proportional term "gain," and $k_2$, which corresponds to the integral term "gain."

The present embodiment is an improvement over prior implementations at least because the signals used for step detection and input to the classifier are less affected by noise and the 2-D movement direction is able to produce any angle rather than quantizing it into one of four possible directions and because of this the shape of the path is more detailed and accurate.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform in the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," and/or "another example" should be considered to mean that the particular features, structures, or characteristics may be combined in one or more examples.

While there has been illustrated and described herein and in Appendix A what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

What is claimed:

1. A computer-implemented method for detecting the steps of a person and estimating the person's three-dimensional (3D) movement to track a location of the person, comprising:

collecting accelerometer data from a worn or person carried device that includes an accelerometer in an unknown tilted orientation relative to a ground frame as the person moves around a physical location, the accelerometer data being indicative of the person's 3D movement relative to the ground frame and sampled based on movement of the person, the accelerometer data comprising x-axis data, y-axis data and z-axis data that corresponds to the movement of the person over a period of time and storing the accelerometer data in a non-transitory memory of a computer having a processor, wherein the person's 3D movement relative to the ground frame forms a reference frame for the device;

determining tilt data indicative of the accelerometer's orientation relative to the ground frame using the accelerometer data;

generating improved accelerometer data indicative of the accelerometer's orientation relative to the reference frame for the device by filtering the accelerometer data using the tilt data;

storing the improved accelerometer data in the non-transitory memory;

generating stride data based on the improved accelerometer data, comprising:

finding by the processor a local minima and a local maxima to detect each step by the person;

finding by the processor an x-displacement along the x-axis and a y-displacement along the y-axis for each step by the person based on the improved accelerometer data for the x-axis and the y-axis and storing the x-displacement and the y-displacement in the memory;

calculating by the processor a two-dimensional (2D) movement displacement and a translation direction for each stride by the person based at least on the x-displacement and the y-displacement; and calculating by the processor an elevation change of the person and storing the elevation change in the memory; and estimating a 3D movement to track the location of the person, on a step by step basis based at least on the stride data.

2. The computer-implemented method as recited in claim 1, wherein the device is a smartphone that includes an accelerometer.

3. The computer-implemented method as recited in claim 1, wherein the accelerometer data is sampled at a frequency greater than twice a Nyquist frequency of the movement of the person.

4. The computer-implemented method as recited in claim 1, wherein the device further includes a gyroscope adding to the x-axis data, the y-axis data and the z-axis data for the device.

5. The computer-implemented method as recited in claim 1, wherein the local minima occurs after each heel strike and wherein the local maxima occurs after each passive position.

6. The computer-implemented method as recited in claim 1, wherein utilizing the processor to find the local minima and the local maxima includes utilizing the processor to reduce extraneous detections by determining if there are any neighboring minima within a sample window of a first number of samples before a local minima and a second number samples after each local minima, and not counting any neighboring minima within the sample window as a local minima.

7. The computer-implemented method as recited in claim 1, wherein the processor utilizes a neural network to classify the person's gait.

8. The computer-implemented method as recited in claim 7, wherein the processor classifies the person's gait on a per step basis.

9. The computer-implemented method as recited in claim 1, wherein utilizing the processor to find the x-displacement and the y-displacement is performed in a time interval between the local minima and the local maxima for each step.

10. The computer-implemented method as recited in claim 1, further comprising utilizing the processor to determine a translation direction for each step, wherein a most frequent direction of translation is forward, and wherein the ground frame is corrected to the y-axis.

11. The computer-implemented method as recited in claim 1, further comprising utilizing the processor to determine a translation direction for each step, wherein a most frequent direction of translation is determined by assigning each possible direction of motion based on each step to a bin for the direction of motion and the bin with the highest frequency is considered the most frequent direction of translation.

12. The computer-implemented method as recited in claim 1, further comprising utilizing the processor to determine a translation direction for each step, and further comprising detecting a transition corresponding to an abrupt change in orientation of the device and discontinuing the step of utilizing the processor to determine a translation direction for each step until the transition has completed.

13. The computer-implemented method as recited in claim 1, wherein calculating the 3D movement is further based on determining the person's 3D translation and rotation, and further comprising determining a location and a heading for the person based on the 3D translation and rotation.

14. The computer-implemented method as recited in claim 1, further comprising utilizing the processor to determine a translation direction for each step, wherein even and odd steps are tracked separately to find a most frequent direction of translation for even steps and for odd steps, and a forward direction is determined as an average of the most frequent translation direction for the even steps and the odd steps.

15. The computer-implemented method as recited in claim 1, further comprising utilizing the processor to determine a translation direction for each step, wherein a most frequent direction of translation for even steps and for odd steps is separately determined by:

assigning each direction of motion based on each step to a bin for the direction of motion; and considering the bin with a highest frequency as the most frequent direction of translation, and wherein a forward direction is determined as an average of the most frequent translation direction for the even steps and the odd steps.

16. A computer-implemented method for classifying a person's gait, comprising:

collecting accelerometer data from a worn or person carried device that includes an accelerometer in an unknown tilted orientation relative to a ground frame as the person moves around a physical location, the accelerometer data being indicative of the person's 3D movement relative to the ground frame and sampled based on movement of the person, the accelerometer data comprising x-axis data, y-axis data and z-axis data that corresponds to the movement of the person over a period of time and storing the data in a non-transitory memory, wherein the person's 3D movement relative to the ground frame forms a reference frame for the device;

determining tilt data indicative of the accelerometer's orientation relative to the ground frame using the accelerometer data;

generating improved accelerometer data indicative of the accelerometer's orientation relative to the reference frame for the device by filtering the accelerometer data using the tilt data;
storing the improved accelerometer data in the non-transitory memory;
generating stride data based on the improved accelerometer data comprising:
  detecting steps of the person within the improved accelerometer data;
  inputting to a neural network a first number of values of each of the x-axis, y-axis and z-axis components of angle vectors for each step;
  inputting to the neural network a second number of values of each of the x-axis, y-axis and z-axis components of velocity vectors for each step;
  inputting to the neural network a minimum and a maximum acceleration amplitude difference over each step;
  inputting to the neural network an orientation vector at the end of each step; and
  inputting to the neural network an index where a magnitude of the x-axis and y-axis plane acceleration achieves a minimum value for each step; and
classifying by the neural network the person's gait as a level gait, an up gait, or a down gait, based on the stride data.

17. The method of claim 16, further comprising:
calculating by the processor a two-dimensional (2D) movement displacement for each step by the person;
when the person's gait is classified as the up gait or the down gait, calculating the elevation change of the person; and
on a step by step basis, calculating the 3D movement of the person based at least on the 2D movement displacement and the elevation change in order to track a location of the person.

18. The computer-implemented method as recited in claim 16, wherein the accelerometer data is sampled at a frequency greater than twice a Nyquist frequency of the movement of the person.

19. A computer-implemented method for detecting the steps of a person and estimating the person's two-dimensional (2D) movement to track a location of the person, comprising the steps of:
collecting accelerometer data from a worn or person carried device that includes an accelerometer in an unknown tilted orientation relative to a ground frame as the person moves around a physical location, the accelerometer data being indicative of the person's 3D movement relative to the ground frame sampled based on movement of the person, the accelerometer data comprising x-axis data, y-axis data and z-axis data that corresponds to the movement of the person over a period of time and storing the accelerometer data in a non-transitory memory of a computer having a processor, wherein the person's 3D movement relative to the ground frame forms a reference frame for the device;
determining tilt data indicative of the accelerometer's orientation relative to the ground frame using the accelerometer data;
generating improved accelerometer data indicative of the accelerometer's orientation relative to the reference frame for the device by filtering the accelerometer data using the tilt data;
storing the improved accelerometer data in the non-transitory memory;
generating stride data based on the improved accelerometer data, comprising:
  calculating using the filtered accelerometer data a periodic signal where a period of the filtered accelerometer data is the same as a step period of the person;
  finding by the processor a local minima and a local maxima of the periodic signal, wherein one of the local minima or the local maxima are used to detect each step by the person;
  finding by the processor an x-displacement along the x-axis and a y-displacement along the y-axis for each step by the person based on the filtered accelerometer data for the x-axis and the y-axis between the local minima and the local maxima and storing the x-displacement and the y-displacement in the memory; and
  calculating by the processor a 2D movement displacement and a translation direction for each stride by the person based at least on the x-displacement and the y-displacement; and
estimating a 2D movement to track the location of the person on a step by step basis, based at least on the stride data.

20. The computer-implemented method of claim 19, wherein finding by the processor an x-displacement and a y-displacement is further based on a double integration of the filtered accelerometer data.

21. The computer-implemented method as recited in claim 19, wherein the accelerometer data is sampled at a frequency greater than twice a Nyquist frequency of the movement of the person.

22. A computer-implemented method for detecting the steps of a person and estimating the person's two-dimensional (2D) movement to track a location of the person, comprising the steps of:
collecting gyroscope data from a worn or person carried device that includes a gyroscope in an unknown tilted orientation relative to a ground frame as the person moves around a physical location, the gyroscope data being indicative of the person's 3D movement relative to the ground frame and sampled based on movement of the person, the gyroscope data comprising x-axis data, y-axis data and z-axis data that corresponds to rotation of the device over a period of time and storing the gyroscope data in a non-transitory memory of a computer having a processor, wherein the person's 3D movement relative to the ground frame forms a reference frame for the device;
determining tilt data indicative of the gyroscope's orientation relative to the ground frame using the gyroscope data;
generating improved accelerometer data indicative of the gyroscope's orientation relative to the reference frame for the device filtering the gyroscope data using the tilt data;
storing the improved accelerometer data in the non-transitory memory;
generating stride data based on the improved accelerometer data, comprising:
  calculating using the improved gyroscope data a periodic signal where a period of the filtered gyroscope data is based on a stride period of the person;
  finding by the processor a local minima and a local maxima of the periodic signal;
  finding by the processor an x-motion around the x-axis and a y-motion around the y-axis between the local minima and the local maxima based on the filtered gyroscope data for the x-axis and the y-axis and storing the x-motion and the y-motion in the memory; and estimating a 2D movement to track the location of the person based at least on the stride data.

23. The computer-implemented method of claim 22, wherein a stride is two alternating steps by the person.

24. The computer-implemented method as recited in claim 23, wherein the gyroscope data is sampled at a frequency greater than twice a Nyquist frequency of the movement of the person.

* * * * *